(12) United States Patent
Kumar et al.

(10) Patent No.: US 10,965,986 B2
(45) Date of Patent: Mar. 30, 2021

(54) SYSTEMS AND METHODS FOR SWITCHING CONTENT PROVIDERS TO MAINTAIN STREAMING EXPERIENCE

(71) Applicant: Rovi Guides, Inc., San Jose, CA (US)

(72) Inventors: Vijay Kumar, Karnataka (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/417,261

(22) Filed: May 20, 2019

(65) Prior Publication Data

US 2020/0374586 A1  Nov. 26, 2020

(51) Int. Cl.
| | |
|---|---|
| H04N 21/45 | (2011.01) |
| H04N 21/466 | (2011.01) |
| H04N 21/414 | (2011.01) |
| H04N 21/442 | (2011.01) |

(52) U.S. Cl.
CPC ... *H04N 21/4516* (2013.01); *H04N 21/41407* (2013.01); *H04N 21/442* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 6,341,374 B2* | 1/2002 | Schein | H04N 21/4622 725/43 |
| 7,761,892 B2 | 7/2010 | Ellis | |
| 8,046,801 B2 | 10/2011 | Ellis | |
| 2005/0251827 A1 | 11/2005 | Ellis | |
| 2006/0128422 A1* | 6/2006 | van Rooyen | H04H 20/24 455/552.1 |
| 2011/0209025 A1* | 8/2011 | Takahashi | H04N 21/234336 714/752 |
| 2011/0320588 A1* | 12/2011 | Raleigh | H04W 24/02 709/224 |
| 2013/0114940 A1* | 5/2013 | Merzon | H04N 5/44543 386/241 |
| 2014/0125703 A1* | 5/2014 | Roveta | H04N 21/4788 345/633 |
| 2014/0208360 A1* | 7/2014 | Kardatzke | H04N 21/482 725/48 |
| 2015/0019465 A1* | 1/2015 | Littlejohn | H04B 1/1027 706/12 |
| 2015/0120957 A1* | 4/2015 | Yun | H04L 65/4076 709/231 |
| 2016/0353148 A1* | 12/2016 | Prins | H04N 21/6175 |

(Continued)

*Primary Examiner* — Fernando Alcon
(74) *Attorney, Agent, or Firm* — Haley Guiliano LLP

(57) ABSTRACT

Systems and methods are described herein for selecting content providers based on performance scores of the respective content providers. The system monitors the performance of a content provider, where the performance is based on the quality of service for receiving a media content item from the content provider. Based on the monitored performance, the system may determine if an adequate performance is not achievable. In response to determining that an adequate performance is not achievable, the system compares the performance of the content provider to the performance of a second content provider and provides, on the user device, the media content item from the second content provider.

27 Claims, 7 Drawing Sheets

(56) References Cited

U.S. PATENT DOCUMENTS

| | | | |
|---|---|---|---|
| 2017/0013296 A1* | 1/2017 | Millar | H04N 21/8456 |
| 2017/0188059 A1* | 6/2017 | Major | H04N 21/2747 |
| 2017/0332146 A1* | 11/2017 | Klappert | H04N 21/4826 |
| 2019/0045241 A1* | 2/2019 | Alexander | H04L 65/605 |
| 2019/0373296 A1* | 12/2019 | Oakley | H04N 21/8547 |
| 2020/0296451 A1* | 9/2020 | Hassler | H04N 21/437 |

* cited by examiner

200A

200B

SYSTEMS AND METHODS FOR SWITCHING CONTENT PROVIDERS TO MAINTAIN STREAMING EXPERIENCE

BACKGROUND

The present disclosure is directed to digital content delivery, and more particularly, to selecting a content provider based on a respective content delivery performance.

SUMMARY

Systems and methods are described herein for receiving a media content item on a user device. In some embodiments, a request is received, at a user device, to receive the media content item, using a first application, from a first content provider. Using control circuitry, a first performance score is calculated for receiving the media content item at the user device, using the first application, from a first content provider. Using control circuitry, the first performance score is compared to a predetermined performance value score to determine whether an adequate performance is achievable for receiving the first media content item. When an adequate performance is determined not to be achievable, a second performance score is calculated that is associated with receiving at the user device, using a second application, the media content item from a second content provider. The second performance score is compared to the first performance score to determine a performance indication identifying which of the first application and the first content provider or the second application and the second content provider provides better performance. When the performance indication identifies the second application and the second content provider as providing better performance, the media content item is received at the user device, using the second application, from the second content provider. Otherwise, if an adequate performance is determined to be achievable from the first application and the first content provider, the media content item is provided from the first content provider.

In some embodiments, at least a first portion of the media content item is received at the user device using the first application from the first content provider. In some embodiments, at least a portion of the media content item is received, using the second application, from the second content provider. In some embodiments, in response to determining that an adequate performance is not achievable from the first content provider, a resumption time is determined within the media content item from the second content provider and the media content item is provided, for display at the user device using the second application, at the resumption time within the media content item, from the second content provider. In some embodiments, the resumption time is determined by identifying a timestamp that indicates playback progress of the media content item from the first content provider and identifying a content segment in the media content item from the second content provider using the timestamp. In some embodiments, the first performance score associated with receiving, using the first application at the user device, the media content item from the first provider is calculated by determining weights for quality-of-service characteristics for receiving media content items (e.g., video resolution, frame rate, or bit error rate) and calculating a weighted sum based on weighted quality-of-service values. In some embodiments, the first performance score is compared with the predetermined performance value by obtaining historic performance scores determined by a group of user devices comprising the user's device and other users' devices. In some embodiments, in response to determining that the adequate performance is not achievable, the second content provider is determined to be able to provide the media content item to the user device. In some embodiments, a notification is generated that indicates the media content item is or can be received from the second content provider. In some embodiments, the first application is used through an application programming interface (API) associated with the first application and the second application is used through an API associated with the second application.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DETAILED DESCRIPTION OF THE DRAWINGS

Figure 1:
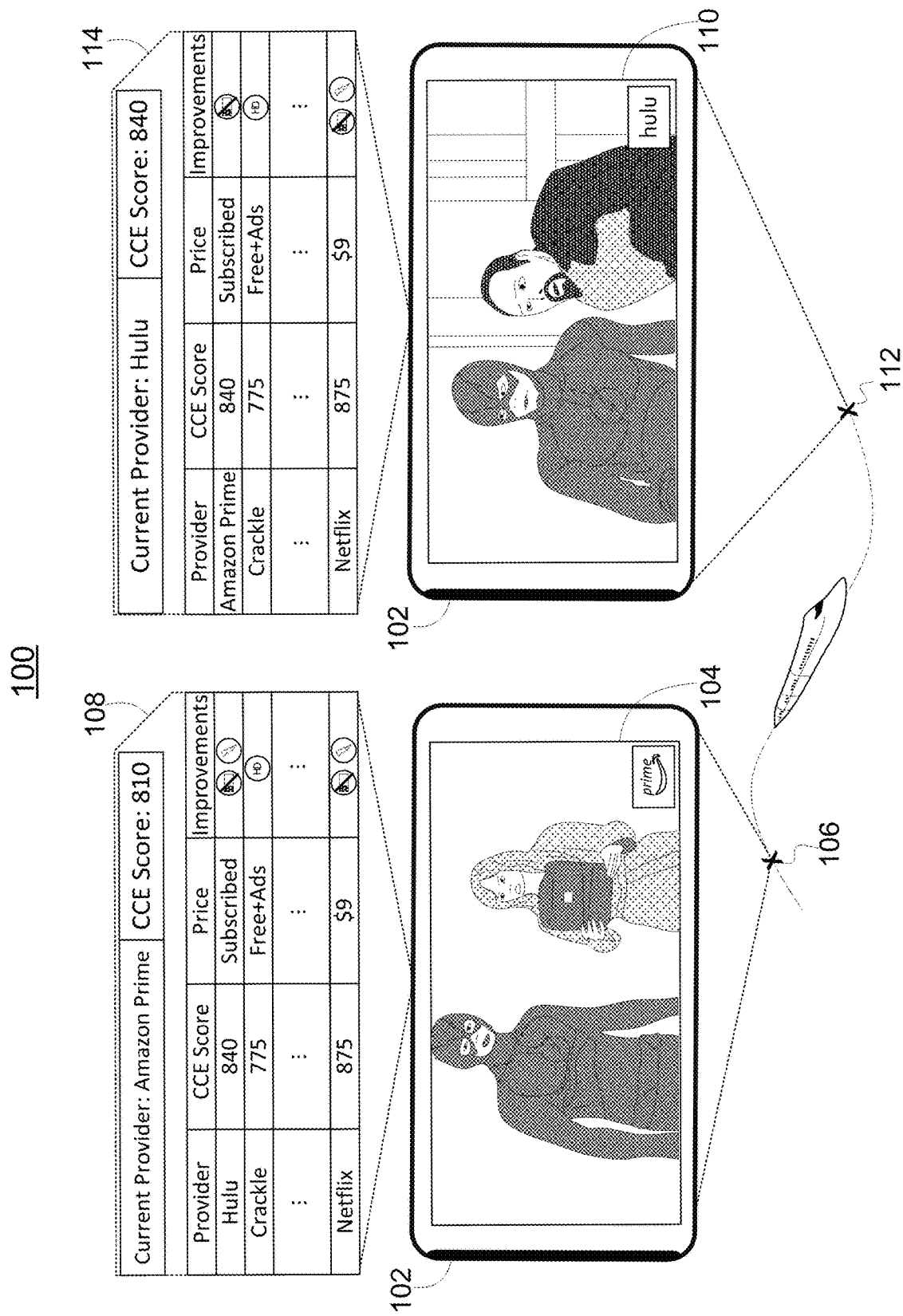
FIG. 1 shows an illustrative use case of a user device monitoring content consumption experience over time, in accordance with some embodiments of the disclosure.

Systems and methods are described herein for selecting content providers, based on the determined performance of content providers.

Digital media content is readily available to consumers in an increasingly mobile world. Media content like movies, games, and music may be consumed in a taxi traveling through a dense metropolitan city or in a café in a remote mountain village, granting consumers more flexibility and access to content where and when they want it. In, for example, the context of mobile content consumption, any particular communication network cannot provide the best performance under all circumstances. Consumers are paying more for a larger variety of content and on-demand access to this content but are limited by the infrastructure used to deliver the content. For example, content providers using data centers may provide content to customers who live closer to a data center faster than they would be able to provide content to those living farther away. In another example, forces outside of the control of content providers (e.g., privatized regulations surrounding Internet communication bandwidth and speeds) may slow the bit rate of certain content providers. In conventional systems, consumers cannot compare the performance between content providers that are affected by these conditions.

Systems and methods are described herein for selecting a content provider before or during content consumption. In some embodiments, a media content application monitors the performance for a user device to receive a media content item from a first content provider. In some embodiments, the media content application determines performance through a score, which is referred to herein, interchangeably, as a content consumption experience (CCE) score or a performance score. This score may represent a weighted aggregate of quality-of-service (QoS) characteristics such as bit error rate (BER), video resolution, transmission delay, frame rate, any suitable communication performance characteristic, or any combination thereof. In some embodiments, with each calculation of a CCE score, the media content application compares the CCE score to a predetermined score. In some embodiments, this predetermined score is used by the media content application in determining whether the performance for a user device to receive a media content item from a first content provider is abnormal for a given location and time-of-day. This predetermined score may be based on historic CCE scores associated with the instant user device's experiences, other user devices' experiences, or both with respect to receiving media content items from the first content provider.

Media content items may be provided by a variety of content providers through respective software applications implemented on the user device and executed by the media content application through, for example, application programming interfaces (APIs). The media content application is responsible for determining when to switch between content providers (including switching between respective applications) for delivery of a particular content item. In some embodiments, content providers are over-the-top (OTT) content providers (e.g., Netflix, Hulu, or Amazon Prime). Content providers each establish their own infrastructure for providing content (e.g., server locations or transmission bit rate restrictions). A first QoS characteristic may be prioritized by the media content application over a second QoS characteristic through the use of weights when the media content application calculates CCE scores. A CCE score may be a weighted sum of QoS characteristic values, where each of the characteristic values is determined using current communications network conditions. The value of the weights may be based on user preference, tailored for a specific content provider, location, or time of day, or a combination of the two. User preference may also affect the content providers that the media content application determines CCE scores for. For example, when the media content application searches for a second content provider that offers the media content item currently being provided from a first content provider, the media content application limits, based on a user preference to not pay for an additional content subscription, search results to only the content providers to which the user is already subscribed. Likewise, the media content application may begin its search for a second content provider by beginning only with content providers that the user has subscribed to, and further limit the search results to subscriptions that have the media content item currently being viewed.

When the media content application has determined that the user device is able to receive the media content item from a second content provider with a higher CCE score, the media content application acts to switch the first content provider to the second content provider. For example, the media content application automatically switches between content providers using the APIs for the respective content providers, optionally giving the user a notification that the switch has occurred. In some embodiments, the media content application provides notifications to allow the user to choose whether she or he wants to switch over to a different content provider. The choice may include one other provider that the media content application has determined to have the highest CCE score improvement over the current provider's CCE score, a list of content providers that all have higher CCE scores than the current provider's, or a list of all content providers, regardless of whether their CCE score is an improvement, that offer the media content item. These notifications are generated before, during, or after the switch between providers. If the media content application has automatically switched content providers, it may also present an option to switch back to the previous content provider should the user change his or her mind. The media content application may switch between content providers with minimal interruption to the user by resuming the media content item from the second content provider at the playback time to which it was last consumed from the first content provider. For example, the media content application may determine a timestamp to which the media content item was last being provided from the first content provider (e.g., the 35-minute mark) and a content segment associated with that timestamp (e.g., the fifth scene). The media content application then determines at which time the fifth scene appears in the media content item provided by the second content provider (e.g., the 25-minute mark, because the second content provider cut the fourth scene from its version). The media content application may then determine the appropriate time to resume playback in the media content item from the second content provider.

FIG. 1 shows illustrative use case 100 of user device 102 monitoring performance over time, in accordance with some embodiments of the disclosure. User device 102 is providing a media content item (e.g., movie) at location 106 as a train is traveling towards location 112. At location 106, user device 102 is providing instantiation 104 of the media content item from a content provider (e.g., Amazon Prime). Metadata 108 is associated with instantiation 104 at location 106 and the time of day at which user device 102 was at location 106. The process performed in use case 100 may be performed by hardware such as control circuitry and processing circuitry, as described in the descriptions of FIGS. 4-5.

The media content application on user device 102 monitors the performance score for user device 102 to receive the media content item from Amazon Prime continuously, periodically according to a preset or dynamically determined period, or in response to a trigger event. The media content application may monitor the performance score for user device 102 to receive the media content item from other content providers (e.g., Hulu, Crackle, or Netflix) continuously, periodically according to a preset or dynamically determined period, or in response to a trigger event. The media content application determines if the performance score for the user device to receive the media content item would be improved if the content's source was switched from a first content provider to a second content provider. In some embodiments, the media content application begins providing a media content item (e.g., a first portion of the media content item) from a first content provider, and after determining to switch content providers, the media content application will continue providing the media content item (e.g., a second portion of the media content item) from a second content provider. The media content application has access to a user profile and user preferences, which may identify what content providers the user is subscribed to and whether the user prefers to receive content only from his current subscriptions. This factors into the media content application process for monitoring available content providers offering a media content item. As the media content application monitors performance when receiving a content item, the media content application calculates a CCE score for the current content provider. In some embodiments, the CCE score is a quantitative amalgamation of performance data, which may be used to compare with a predetermined minimum score (e.g., the lowest score a content provider may have for a user to tolerate consuming content). In some embodiments, the CCE score is compared with CCE scores of other content providers, times, or locations. The result of the comparison will determine whether the media content application looks for another content provider to provide the media content item.

As referred to herein, the term "media content item" should be understood to mean an electronically consumable user asset, such as television programming, as well as pay-per-view programs, on-demand programs, Internet content (e.g., streaming content, downloadable content, or Webcasts), video clips, audio, playlists, electronic books, social media, applications, games, any other media, or any combination thereof. Media content items may be recorded, played, displayed or accessed by devices. As referred to herein, "content providers" are digital repositories, conduits, or both of media content items. Content providers may include cable sources, over-the-top content providers, or other sources of content. It will be understood that while different content providers may provide an identically titled media content item such as a movie, television show, music, or any other suitable media content item, there may exist differences between the media content item provided by one content provider versus the identically titled media content item provided by a different content provider. For example, differences may exist with respect to branding and other embedded advertisement content, resolution, closed captioning content, any other suitable peripheral difference, or any combination thereof. For purposes of this disclosure, despite such differences, the media content provided by one content provider shall be treated as identical to the identically titled media content item provided by another content provider. Differences in features such as resolution may be taken into account when determining performance in accordance with the present disclosure.

As referred to herein, a "user device" should be understood to mean an electronic device capable of providing media content for consumption directly to a user. User devices include smartphones, tablets, virtual reality headsets, televisions, any other electronic device for content consumption, or any suitable combination thereof. As referred to herein, a "media content application" includes any suitable software, hardware, or both for implementing the features described herein. The media content application may be implemented either entirely or partially on a user device such as user device 102. When implemented partially on user device 102, the media content application may be further partially implemented using any other suitable equipment located either locally to user device 102 or remotely from user device 102. The media content application, in some embodiments, functions as a platform for content delivery on a user device. In such embodiments, the media content application is in either direct or indirect communication with one or more content providers using any suitable communication channels. For example, the media content application communicates directly with a content provider without any intermediary application. The media content application may communicate indirectly with a content provider using a proprietary software application configured for use with that particular content provider. In any event, it will be understood that the media content application is configured to measure performance of media content delivery by respective content providers and to determine from which content providers to receive any particular media content item either by way of streaming, download to storage for later consumption, or both. As referred to herein, an "instantiation" of a media content item is a manifestation of the media content item at a single time instance, which may include a video frame, an audio product, a digital fingerprint associated with the manifestation, any suitable representation of the content at a single time instance, or any combination thereof.

Metadata 108 includes CCE scores for the current content provider and other content providers. The CCE score of the current provider, Amazon Prime, is depicted to be 810. The CCE scores of other providers, such as Hulu, Crackle, and Netflix, are depicted as 840, 775, and 875, respectively, for the location 106 and the associated time. In some embodiments, a weighted sum of QoS characteristic values obtained for each QoS characteristic is used to calculate a CCE score.

In one embodiment, the media content application compares the current CCE score of 810 to a predetermined minimum score. For example, if the predetermined minimum score is 800, the media content application determines that the current performance is acceptable, and in response, the media content application does not proceed to search for another content provider provide the media content item. In some embodiments, if the predetermined minimum score is 820, the media content application determines that the current performance is unacceptable, and in response, the media content application proceeds to search for another content provider to provide the media content item. In some embodiments, the media content application compares the current CCE score of 810 to a predetermined minimum score, determines that the content consumption experience is not an anomaly or temporary (e.g., a prolonged, poor content consumption experience), accesses historic CCE data of other applications for respective other content providers, and determines whether to switch to another application of the other content providers' applications. In some embodiments, the media content application compares the current CCE to a predetermined minimum score, determines that the content consumption experience is temporary, and the system continues to provide the content from the current content provider. If the train route is taken routinely, the media content application may have logged previous calculations of the CCE score at location 106. The media content application may compare the current CCE score for Amazon Prime to previously calculated CCE scores for Hulu at location 106, at a similar hour of the day, or a combination of the two (e.g., recorded CCE scores for Hulu taken at location 106 at 7 AM). This allows the media content application to determine, using the historic CCE scores associated with a second content provider, if the second content provider has a record for performing better or worse than the predetermined minimum score. In turn, the media content application determines whether to switch to the second application of the second content provider. If the records of Hulu's CCE scores at location 106 at 7 AM show that the CCE score averages 800, the media content application resumes providing the media content item from Amazon Prime because the performance is deemed acceptable and Hulu has a record for below-par performance. However, if the records of Hulu's CCE scores at location 106 at 7 AM show that the CCE score averages 850, the media content application begins operations for switching to a content provider with a higher CCE score than 810 (e.g., switching to Hulu's content application). The media content application's determination of which content provider to switch to may depend on additional factors such as the price of subscription. In some embodiments, the media content application switches to an application of a content provider with the lowest price of content. If the user has not specified a preference for selecting only content providers for which a subscription is already existing, the media content application includes the prices for each content provider when making a recommendation to switch content providers. For example, the media content application has determined that instantiation 104's CCE score of 810 is too low, and that content providers Hulu and Netflix have greater CCE scores of 840 and 875, respectively. The CCE score for Netflix, although greater than Hulu's, is associated with a necessary payment of $9, while Hulu does not require a payment because the user is subscribed to Hulu and not to Netflix. The media content application determines, based on user preferences, that the user prefers a better content consumption experience over saving money, and so it proceeds to provide the media content item from Netflix. The media content application may determine and record the improvements one content provider has over another. Improvements may include faster download speeds, minimal buffering, higher video resolution, any other suitable performance improvement, or a combination thereof.

Metadata 108 and 114 may be organized in a data structure associating the metadata with a time and location (e.g., Unix time and GPS coordinates). The data structure may include key-value pairs, where the keys may include content provider ID, CCE score, time, and location. Metadata 108 and 114 may be generated in the media content application's background operations and stored or shown to the user through a graphical user interface (GUI). The media content application may present the user of user device 102 with a GUI of the CCE scores, prices, and improvements listed by content provider. By displaying the current content provider's performance and the performance of alternative content providers, the media content application provides a transparent content consumption experience. The user may make a selection using the GUI to switch to another content provider. The media content application may also provide notifications to the user to alert him or her of automatic switches between content providers or alert him or her that other content providers are available to switch to that offer an improved performance. Given a GUI showing the information in metadata 108, the user may select Hulu, prompting the media content application to provide the media content item from Hulu at the playback time of instantiation 104. If the user device is providing the media content item at location 112, the media content application retrieves location-specific CCE scores from metadata 114 (e.g., Hulu's CCE score at location 112). Metadata 114 shows that Hulu's CCE score is 840 at location 112.

When the media content application has determined that a first content provider's CCE score is lower than a predetermined score, the media content application finds a second content provider that provides the media content item. In some embodiments, finding a second content provider includes finding the media content item within the user's subscribed content providers. In this process, the media content application accesses a list of subscribed content providers that could be stored in a user profile. Using the list of subscribed content providers, the media content application searches for the currently provided media content item among the media content items offered by the subscribed content providers. In some embodiments, finding a second content provider includes finding a subscribed content provider among content providers that offers the media content item. The media content application may query content provider servers to receive confirmation that certain content providers are offering the media content. Among those certain content providers, the media content application will determine which the user may access without payment (e.g., which one the user is subscribed to). In the methods described above, the media content application is not limited to searching for content providers that offer services only with subscription. The media content application may also identify the media content item offered by content providers, such as television broadcast networks, that are not subscription-based.

Once the media content application has determined that a second content provider has a higher CCE score for receiving the media content item, the media content application proceeds to provide the media content item from the second content provider. One manner of providing content includes switching between software applications for each of the content providers. The media content application may achieve this switch through the use of APIs for each content provider's software application. For example, in a smart TV's computer system, Hulu and Netflix each have their own software application for accessing content that they provide. Similar software applications exist on mobile smartphone systems. The media content application of use case 100 may redirect the user to Hulu's application through an API for Hulu when it determines, at location 106, that Hulu's CCE score is greater than Amazon Prime's score. The media content application may select media content items from different providers without the need for an API. For example, a media content application that is integrated with content providers' applications may select content items from varying providers without an API. The computer system having the media content application may have already stored login or authentication credentials for the user's Hulu account. If the user has granted the media content application access to other applications on the computer system, such as content provider applications, the media content application may be able to begin downloading the appropriate content segments of the media content item currently being provided before switching applications. Content segments may include video frames of a movie, spectrograms of audio, accumulated data of progress in a video game, any indicator of content consumption, or any suitable combination thereof. In this way, the media content application provides a seamless switch between content providers and the user experiences a less obvious interruption to his content consumption.

To further eliminate any interruptions to the user's content consumption experience, the media content application transitions from ending playback at a first content provider to beginning playback at a second provider at the appropriate timestamp. The appropriate timestamp corresponds to the same content segment of the media content items provided from different content providers. A content provider may tag each content segment with a standardized ID so that the media content application may identify which content segment was the last provided from the first content provider. Without a tag provided by the content provider, the media content application may implement image or audio processing to create tags of content segments. Once the media content application has a tag associated with the last content segment provided by the first content provider and tags associated with the content segments of the media content item from a second content provider, the media content application may locate the appropriate timestamp within the media content item from the second content provider having the same tag.

Figure 2A:
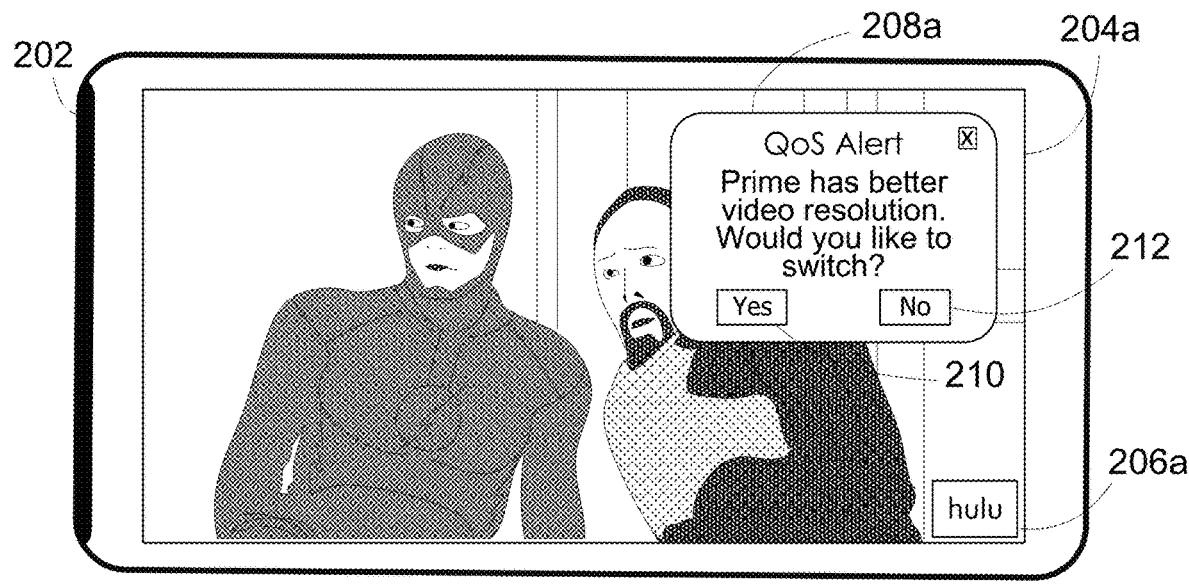
FIGS. 2A and 2B show illustrative user interfaces having notifications of switches between content providers, in accordance with some embodiments of the disclosure.
Figure 2B:
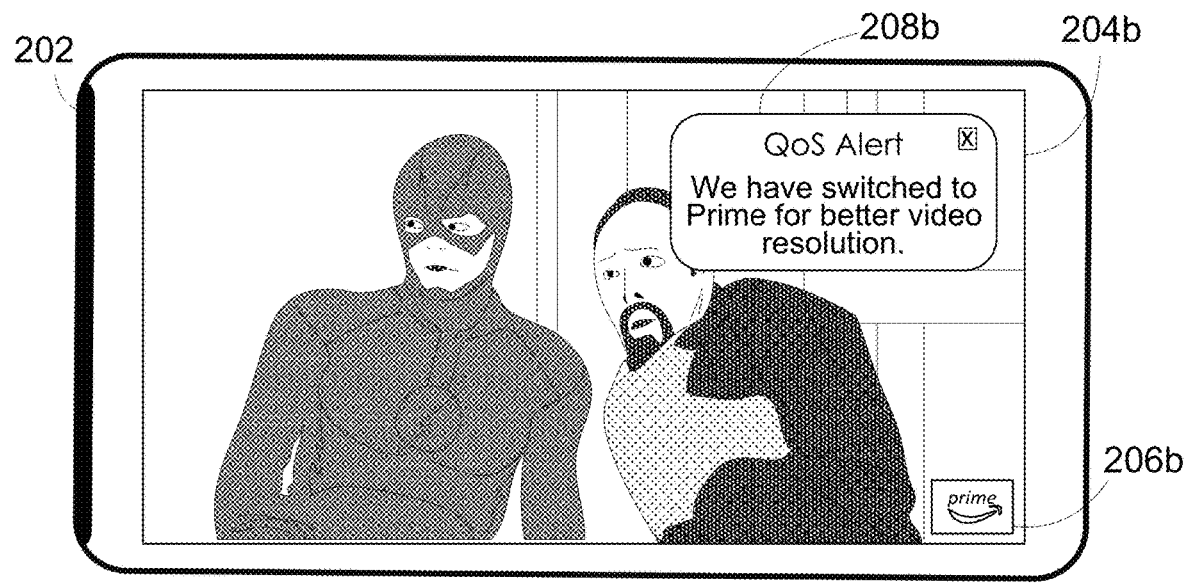

FIGS. 2A and 2B show illustrative user interfaces 200A and 200B, respectively, having notifications of switches between content providers, in accordance with some embodiments of the disclosure. The media content application generates a notification on user interface 200A of user device 202 prior to making a switch between content providers, as depicted in FIG. 2A, to allow the user to select whether she or he wants to switch based on the performance information determined. In FIG. 2B, the media content application is depicted as generating a notification after the media content application has switched over to a different content provider. The notification generation as shown in user interfaces 200A and 200B may be performed by hardware such as control circuitry and processing circuitry, as described in the descriptions of FIGS. 4-5.

FIG. 2A illustrates user device 202 providing media content item at instantiation 204a from content provider 206a. As the media content application provides the content for display on user device 202, it monitors the performance for receiving the media content item from content provider 206a. At a time corresponding to the providing of instantiation 204a, the media content application determines that the CCE score of content provider 206a, Hulu, is below a predetermined threshold, and has found a second content provider (e.g., Amazon Prime) that offers the media content item with a higher CCE score that is reflected by an improvement in performance such as better video resolution. The information determined by the media content application is relayed through notification 208a displayed on user device 202. The media content application, through notification 208a, provides the user with an opportunity to select confirmation button 210 or rejection button 212 and acts accordingly. For example, the user selects confirmation button 210, and the media content application switches the content provider from Hulu to Amazon Prime. As described in the description for FIG. 1, this switching could be done through the media content application's access to the content provider's software applications and user-provided credentials. Alternatively, the user selects rejection button 212 and the media content application continues to provide content from Hulu. The media content application may record the user's selection to temporarily stop generating notifications about content providers with improved performance scores. This may be based on an automatic decision using a user preference stored in the user profile or a third button displayed on the GUI that allows the user to pause notification generation for a certain amount of time. The media content application may also determine the speed at which a user is traveling, based on monitored time and location coordinates, and determine that the next time to alert a user is in 30 minutes, because the user's traveling speed is one in which the distance traveled after 30 minutes is significant enough to warrant a notification generated for a greater improvement in performance. For example, the media content application accesses recorded CCE scores, identifies a pattern in the CCE scores associated with a large increase in CCE score from a second content provider and the user's selection to switch to said second content provider, and stops generating intermittent notifications until the expected performance improvement on the user's usual commute into work. In some embodiments, the media content application determines the distance traveled or time elapsed since the last CCE score was calculated. If the determined distance traveled or time elapsed is below a predefined threshold, the media content application may not search for alternative content applications of respective alternative content providers. Instead of receiving a user selection, the media content application may switch content providers without user input, as depicted in FIG. 2B.

FIG. 2B illustrates notification 208b generated by the media content application on user interface 200B of user device 202 while providing a media content item from content provider 206b. Notification 208b is generated in response to a user selection of confirmation button 210 of FIG. 2A or to a switch to content provider 206b without user input. The media content application monitors performance from the content provider that is currently providing the media content item displayed on user device 202 and uses a predetermined CCE score (e.g., a historic CCE score) to determine that an adequate performance level is not achievable (e.g., the current CCE score is less than the historic CCE score). An adequate performance level may be based on a threshold CCE score, where the threshold is a defining point between what the user deems as acceptable and unacceptable performance to consume content at the user device. As described in the description for FIG. 2A, the media content application may recognize patterns in historic CCE data and determine that the user device is currently traveling a route as reflected in historic CCE scores. The media content application may automatically switch content providers based on the current location matching with a location recorded in historic CCE scores as having a high CCE score with a certain content provider. The media content application, through its monitoring of performance and calculation of CCE scores for receiving the media content item from a content provider, may switch content providers in each instance it detects the current CCE score is unsatisfactory (e.g., below a predetermined CCE score) and that the CCE score for receiving the media content item from a second content provider is greater than the current CCE score.

Figure 3:
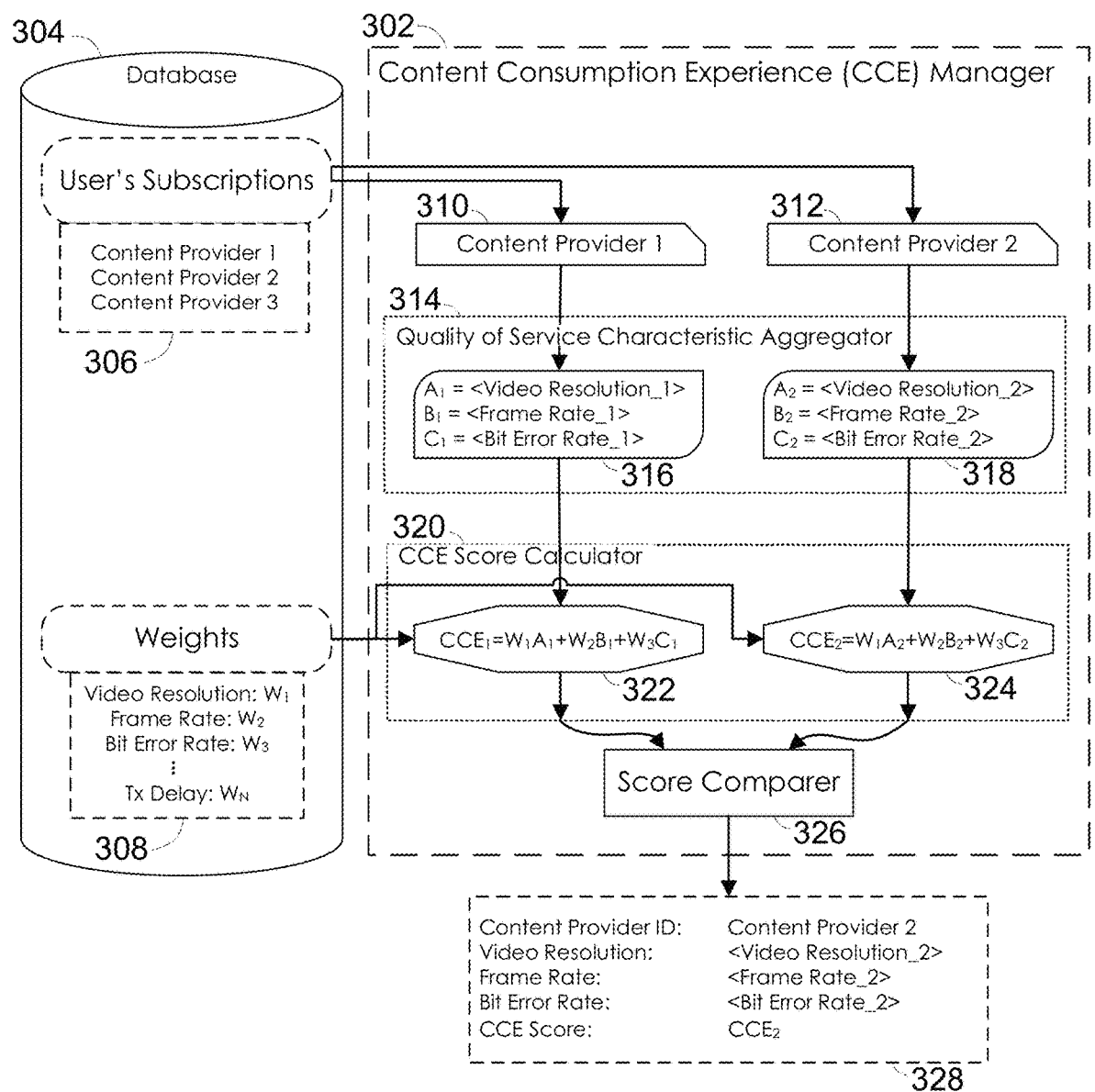
FIG. 3 shows a block diagram of an illustrative content provider determination system, in accordance with some embodiments of the disclosure.

FIG. 3 shows a block diagram of an illustrative content provider determination system 300, in accordance with some embodiments of the disclosure. User devices 102 and 202 may employ media content application 300 for determining content providers with the highest CCE scores. Content Consumption Experience Manager 302 may be a library of functions such as Quality-of-Service Aggregator 314, CCE Score Calculator 320, and Score Comparer 326. CCE Manager 302 accesses database 304 for user subscription information 306 and weight information 308. Database 304 holds user preferences, which include the content providers that the user device is authenticated to access (e.g., subscribed content providers) and weights that may be based on user preferences (e.g., a larger weight placed on video resolution because the user prefers high definition regardless of buffering, delay, or subscription price).

The media content application's CCE Manager 302 begins a process for selecting a content provider by retrieving content provider IDs 310 and 312 from user subscription information 306 in database 304. Content providers may also be associated with respective applications that the media content application accesses through APIs to provide media content items on the user device. QoS Characteristic Aggregator 314 uses content provider IDs 310 and 312 to determine QoS characteristic values for each content provider and application. QoS characteristic value set 316 for content provider ID 310 includes a video resolution value, frame rate value, and bit error rate value stored in variables $A_1$, $B_1$, and $C_1$, respectively. Likewise, a set of QoS characteristic values may be determined for QoS characteristic value set 318 for content ID 312. The QoS characteristic values may be normalized before reaching CCE Score Calculator 320. For example, if a maximum video resolution is 8 k resolution (i.e., 7680×4320 pixels), and the determined video resolution performance is 1024×576 pixels, the QoS characteristic value may be normalized to a unitless value of 0.02 to indicate that the QoS characteristic value is only 2% of the maximum possible value. QoS Characteristic Aggregator 314 may receive QoS characteristic values determined from a separate server or the QoS characteristic values determined from the user device (e.g., the QoS characteristic values experienced by user device 102 or 202 when receiving a media content item from a content provider server). QoS characteristic value sets 316 and 318 are used by CCE Score Calculator 320, which calculates respective CCE scores using weight information 308 taken from database 304. The weights may be catered to each QoS characteristic for all content providers and applications (e.g., "$W_1$" identifies the weight used for video resolution for all content providers and their applications) or catered to each QoS characteristic for a specific content provider and its application (e.g., "$W_1$_Hulu" identifies the weight used for video resolution for Hulu and its Hulu media player application). The weights may be normalized or manipulated if applied to a QoS characteristic having a property for which a higher score does not indicate an improved performance (e.g., a weight for BER may be represented by a value of (1−W) if weight "W" is normalized to a value between 0 and 1 because a higher BER is not preferred). CCE Score Calculator 320 implements a weighted sum algorithm in CCE scores calculations 322 and 324. The media content application is not limited to using a weighted sum algorithm and may use any suitable multi-criteria decision or weighted scoring method. CCE score calculations 322 and 324 apply weights $W_1$, $W_2$, and $W_3$ to QoS characteristic values such that the CCE scores for content provider ID 310 and content provider 312 are determined by Equations 1 and 2, respectively, below.

$$CCE_1 = W_1 A_1 + W_2 B_1 + W_3 C_1 \quad \text{(Eq. 1)}$$

$$CCE_2 = W_1 A_2 + W_2 B_2 \pm W_3 C_2 \quad \text{(Eq. 2)}$$

Calculated CCE scores are then processed by Score Comparer 326 to determine a performance indication that identifies which of either the CCE score associated with the first application and first content provider or the CCE score associated with the second application and the second content provider indicates better performance. Score Comparer 326 outputs data packet 328 associated with the application and content provider that provides better performance. As depicted in FIG. 3, the better performance belongs to the content provider with content provider ID 312. Data packet 328 is a structure with key-value pairs, where the keys include content provider ID, QoS characteristics, and CCE score. Data packets may have any other suitable structure for representing a content provider, its QoS characteristics, and its CCE score.

Figure 4:
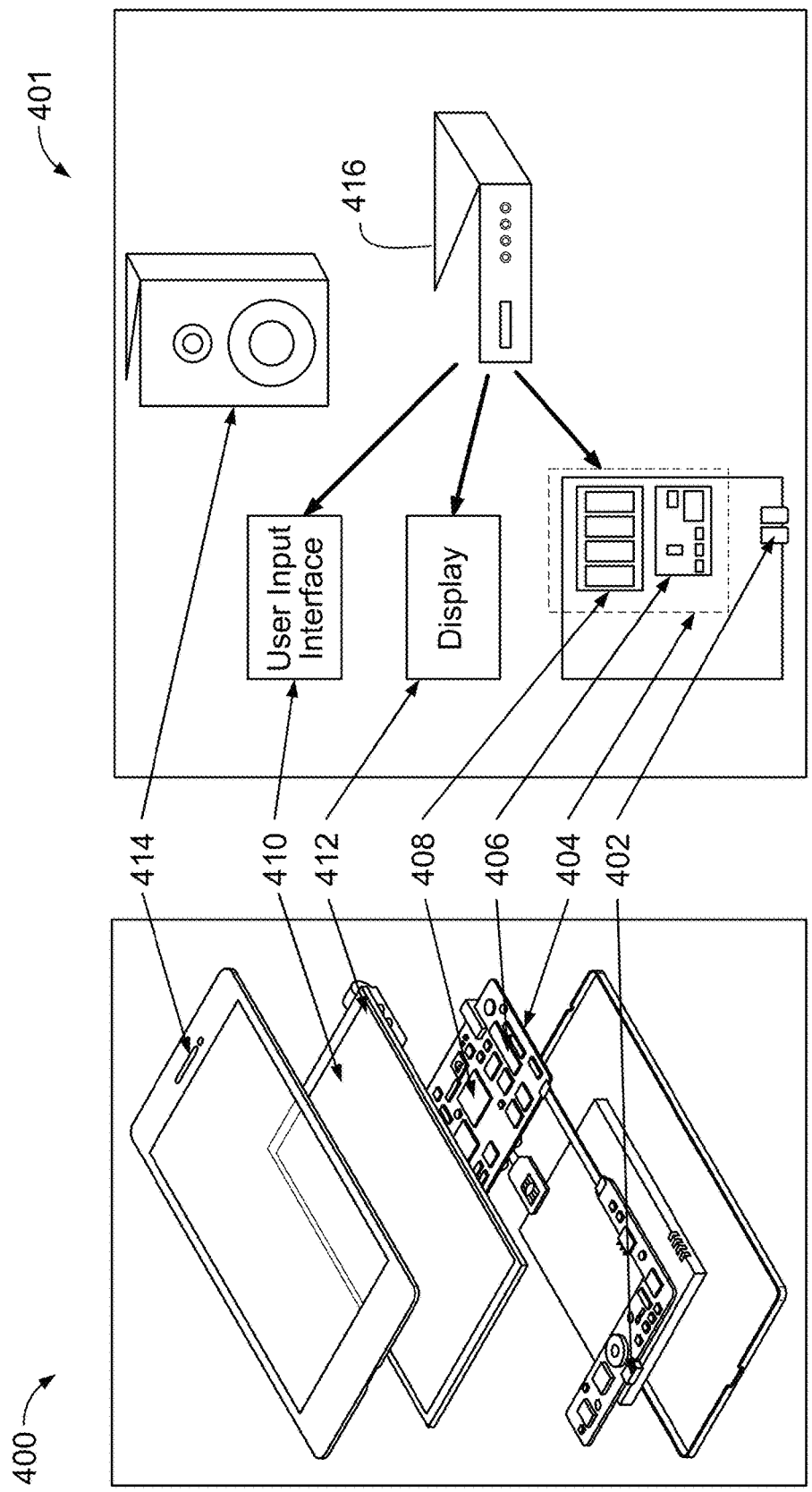
FIG. 4 shows a block diagram of an illustrative media device, in accordance with some embodiments of the disclosure.

Users may access content from one or more of their devices. FIG. 4 shows generalized embodiments of a device capable of presenting content on a display 412. For example, display 412 may belong to a smartphone device. In another example, display 412 may belong to a user television equipment system. User television equipment system with display 412 may include a set-top box 416. Set-top box 416 may be communicatively connected to speaker 414, and display 412. In some embodiments, display 412 may be a television display or a computer display. In some embodiments, set top box 416 may be communicatively connected to user interface input 410. In some embodiments, user interface input 410 may be a remote-control device. Set-top box 416 may include one or more circuit boards. In some embodiments, the circuit boards may include processing circuitry, control circuitry, and storage (e.g., RAM, ROM, Hard Disk, or Removable Disk). In some embodiments, circuit boards may include an input/output path. More specific implementations of devices are discussed below in connection with FIG. 5. Each one of device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to determine QoS characteristics, calculate a CCE score based on those QoS characteristics, and store the calculated CCE score into storage 408. In some implementations, any action performed by control circuitry 404 may be based on instructions received from the application.

In client-server based embodiments, control circuitry 404 may include communications circuitry suitable for communicating with a media content application server or other networks or servers. The instructions for carrying out the above-mentioned functionality may be stored on the media content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, a list of the content providers that the user is subscribed to, authentication credentials for the system to access software applications secured by the content providers, user preferences for QoS characteristics (e.g., a preference for lower price of subscription over higher video resolution), and weights applied when calculating the CCE scores. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores a list of content providers that the user is subscribed to, authentication credentials for the system to access software applications secured by the content providers, user preferences for QoS characteristics (e.g., a preference for lower price of subscription over higher video resolution), and weights applied when calculating the CCE scores. Nonvolatile memory may also be used (e.g., to launch a boot-up routine and other instructions).

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, or multiple-tuner recording). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

The media content application may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the application is a client-server based application. Data for use by a thick or thin client implemented on each one of device 400 and user equipment system 401 is retrieved on-demand by issuing requests to a server remote to each one of device 400 and user equipment system 401. In one example of a client-server based media content application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the media content application is downloaded and interpreted or otherwise run by an interpreter or virtual machine (run by control circuitry 404). In some embodiments, the media content application may be encoded in the ETV Binary Interchange Format (EBIF), received by control circuitry 404 as part of a suitable feed, and interpreted by a user agent running on control circuitry 404. For example, the media content application may be an EBIF application. In some embodiments, the media content application may be defined by a series of JAVA-based files that are received and run by a local virtual machine or other suitable middleware executed by control circuitry 404. In some of such embodiments (e.g., those employing MPEG-2 or other digital media encoding schemes), the media content application may be, for example, encoded and transmitted in an MPEG-2 object carousel with the MPEG audio and video packets of a program.

Figure 5:
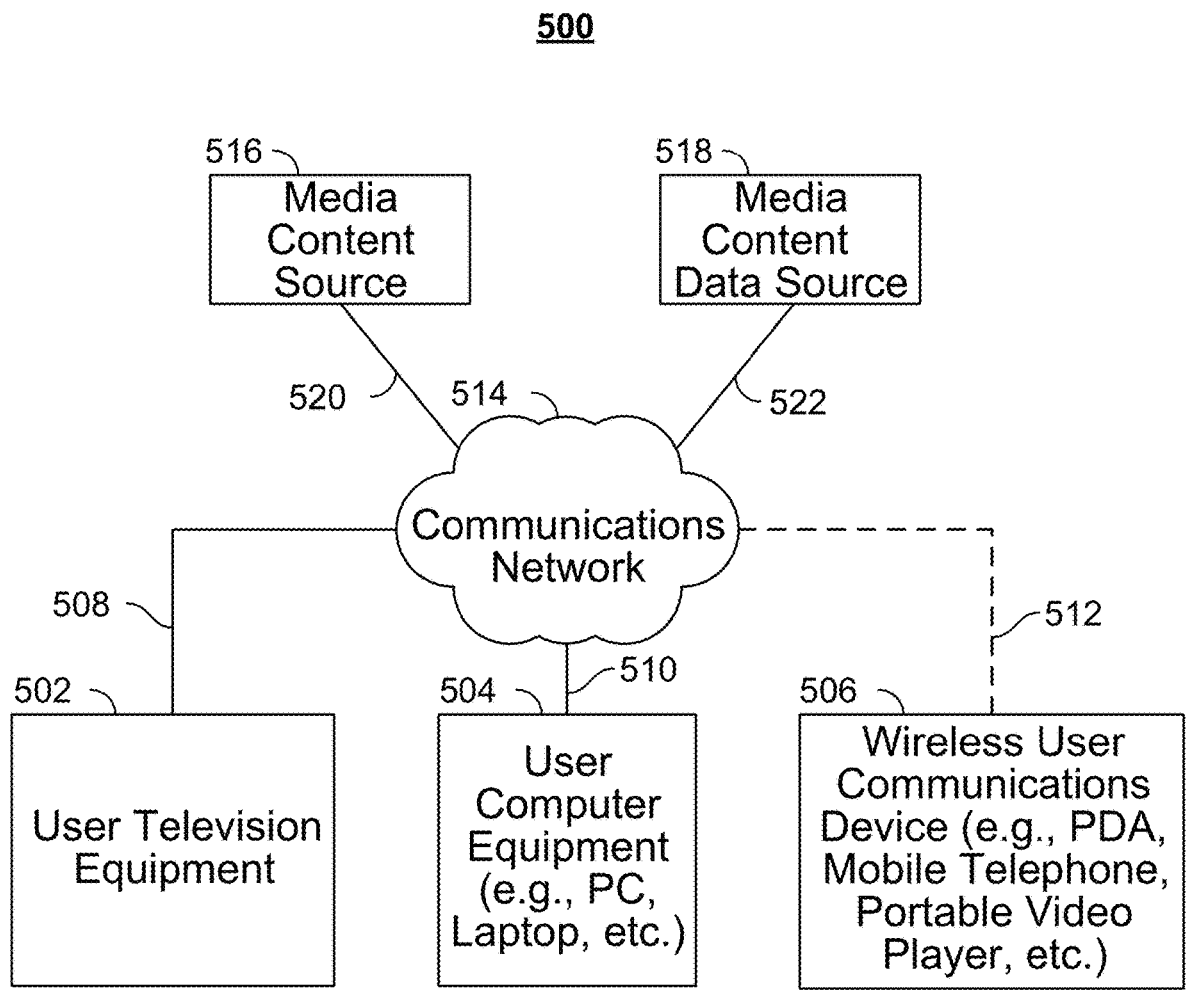
FIG. 5 shows a block diagram of an illustrative content provider selection system, in accordance with some embodiments of the disclosure.

Each one of device 102, 202, 400 and user equipment system 401 of FIG. 4 may be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a stand-alone device or may be part of a network of devices. Various network configurations of devices may be implemented and are discussed in more detail below.

A device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the media content application may be provided as a web site accessed by a web browser. In another example, the media content application may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

In some embodiments, a device (e.g., user television equipment 502, user computer equipment 504, wireless user communications device 506) may be referred to as a "second device." For example, a second device may provide an interface for adjusting settings and display preferences of the first device. In some embodiments, the second device is configured for interacting with other second devices or for interacting with a social network. The second screen device may be located in the same room as the first device, a different room from the first device but in the same house or building, or in a different building from the first device.

The user may also set various settings to maintain consistent application settings across in-home devices and remote devices. For example, if a user enables selection of a content provider based on performance scores on their personal computer at their office, this feature would also be enabled on the user's in-home devices (e.g., user television equipment and user computer equipment) as well as the user's mobile devices, if desired. Therefore, changes made on one device may change the content experienced on another device, regardless of whether they are the same or a different type of device. In addition, the changes made may be based on settings input by a user, as well as user activity monitored by the media content application. In addition, two devices may work together to provide functionality for the user. For example, the first device performing a content provider switch may further instruct the second device to perform a similar switch if it is also providing the same media content item from the first content provider.

The devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communications paths, such as those described above in connection with paths 508, 510, and 512, as well as other short-range point-to-point communications paths, such as USB cables, IEEE 1394 cables, wireless paths (e.g., Bluetooth, infrared, or IEEE 502-11x), or other short-range communication via wired or wireless paths. BLUETOOTH is a certification mark owned by Bluetooth SIG, INC. The devices may also communicate with each other directly through an indirect path via communications network 514.

System 500 includes content source 516 and content data source 518 coupled to communications network 514 via communications paths 520 and 522, respectively. Paths 520 and 522 may include any of the communications paths described above in connection with paths 508, 510, and 512. Communications with the content source 516 and content data source 518 may be exchanged over one or more communications paths but are shown as a single path in FIG. 5 to avoid overcomplicating the drawing. In addition, there may be more than one of each of content source 516 and content data source 518, but only one of each is shown in FIG. 5 to avoid overcomplicating the drawing. If desired, content source 516 and content data source 518 may be integrated as one source device. Although communications between sources 516 and 518 with devices 502, 504, and 506 are shown as through communications network 514, in some embodiments, sources 516 and 518 may communicate directly with devices 502, 504, and 506 via communications paths (not shown) such as those described above in connection with paths 508, 510, and 512.

Content source 516 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 516 may be the originator of content (e.g., a television broadcaster or a Webcast provider) or may not be the originator of content (e.g., an on-demand content provider or an Internet provider of content of broadcast programs for downloading). Content source 516 may include cable sources, satellite providers, on-demand providers, Internet providers, over-the-top content providers, or other providers of content. Content source 516 may also include a remote content server used to store different types of content (including video content selected by a user), in a location remote from any of the devices. Content source 516 may include at least 2 sources for content that provide content for the media content application to provide on the user devices (e.g., user devices 102 and 202). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 518 may provide data related to the content. Content data may be provided to the devices using any suitable approach. In some embodiments, the media content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 518 may be provided to user's equipment using a client-server approach. For example, a user equipment device may pull content data from a server, or a server may push content data to a user equipment device. In some embodiments, a media content application client residing on the user's equipment may initiate sessions with source 518 to obtain content data when needed, e.g., when the content data is out of date or when the device requests the data. Content data may be provided to the user equipment with any suitable frequency (e.g., continuously, daily, a user-specified period of time, a system-specified period of time, or in response to a request from user equipment). Content data source 518 may provide devices 502, 504, and 506 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, or brain activity information). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content or content segments (e.g., characteristics of content portions, content segments related to a current portion of content based on a characteristic). The content data may also include user profiles used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., content data source 518) running on control circuitry of the remote server. When executed by control circuitry of the remote server (such as content data source 518), the application may instruct the control circuitry to generate the content displays and transmit the generated displays to the devices. The server application may instruct the control circuitry of the content data source 518 to transmit data for storage on the device. The client application may instruct control circuitry of the receiving user equipment to generate the content displays.

Content and/or content data delivered to devices 502, 504, and 506 may be OTT content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 500 is intended to illustrate a number of approaches, or network configurations, by which devices and sources of content and content data may communicate with each other for the purpose of accessing content and providing the ability to switch content providers based on QoS characteristics determined for receiving the content from respective content providers. The embodiments described herein may be applied in any one or a subset of these approaches, or in a system employing other approaches for delivering content. The following four approaches provide specific illustrations of the generalized example of FIG. 5.

In one approach, devices may communicate with each other within a home network. Devices may communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various media content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may use content navigation button 120 on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, content segment buffering enablement, or other settings) on the online media content application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home may use their application to communicate directly with content source 516 to access content. Specifically, within a home, users of user television equipment 502 and user computer equipment 504 may access the application to navigate among and locate desirable content. Users may also access the application outside of the home using wireless user communications devices 506 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud may include a collection of server computing devices, which may be located centrally or at distributed locations, that provide cloud-based services to various types of users and devices connected via a network such as the Internet via communications network 514. These cloud resources may include one or more content sources 516 and one or more content data sources 518. In addition or in the alternative, the remote computing sites may include other devices, such as user television equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services may be provided in the cloud through cloud computing service providers, or through other providers of online services. For example, the cloud-based services may include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device may stream audio from one cloud resource while downloading content from a second cloud resource. Or a user device may download content from multiple cloud resources for more efficient downloading. In some embodiments, devices may use cloud resources for processing operations such as the processing operations performed by processing circuitry described in relation to FIG. 4.

Any one or more of device 400 and user equipment system 401 of FIG. 4 and user television equipment 502, user computer equipment 504, and wireless user communications device 506 of FIG. 5 may be used to provide a thorough and efficient content consumption experience. For example, the media content applications, associated with user devices, of the present disclosure may select a content provider or switch providing a media content item from one content provider to another based on determined CCE scores, providing a steady or improved content consumption experience. Further details of the present disclosure are discussed below in connection with the flowcharts of FIGS. 6 and 7.

Figure 6:
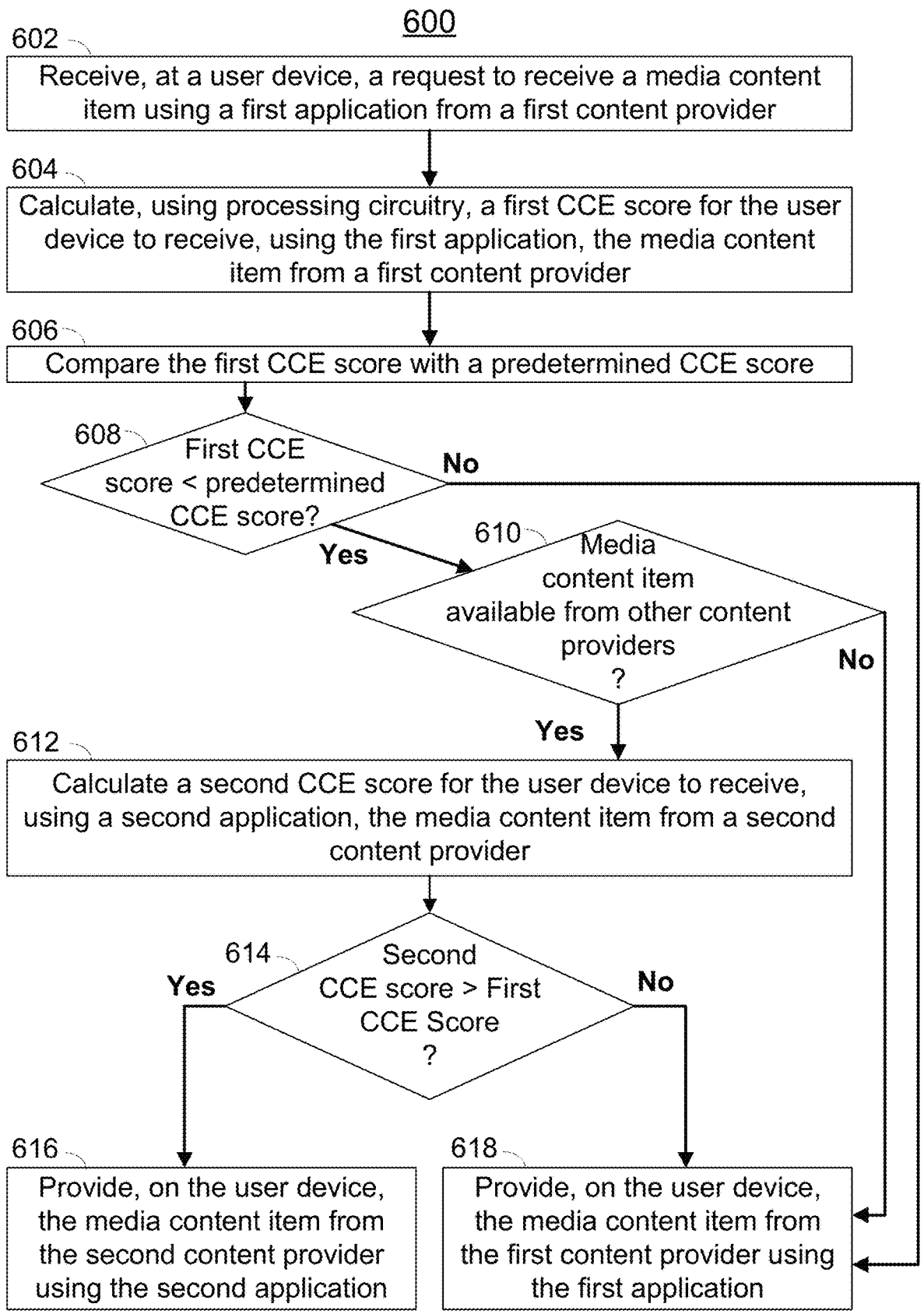
FIG. 6 depicts an illustrative flowchart of a process for selecting content providers, in accordance with some embodiments of the disclosure.

FIG. 6 depicts an illustrative flowchart of a process 600 for selecting content providers, in accordance with some embodiments of the disclosure. It should be noted that the steps of process 600 may be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5 such as user device 102 of FIG. 1 and user device 202 of FIG. 2), part of a remote server separated from the user equipment by way of a communications network (e.g., communications network 514 of FIG. 5), or distributed over a combination of both.

At step 602, the media content application receives, at a user device, a request to receive a media content item using a first application from a first content provider. In some embodiments, the request may be received from a user input interface on the user device (e.g., a touchscreen selection of a movie from Hulu). In some embodiments, the request may be based on stored user preferences (e.g., the user defaults to receiving media content items from Hulu). In some embodiments, the user need only select a media content item title and in response, the media content application automatically selects which content provider to use (e.g., based on the performance scores of content providers or user preferences). The media content application may receive the media content item from a cloud-based server or any other remote server whose transmission performance of the media content item may be characterized using a CCE score. In some embodiments, the CCE score is based on any one or more suitable QoS parameters such as bit error rate (BER), video resolution, transmission delay, frame rate, any other suitable communications performance metric, or any combination thereof. The media content application, in one embodiment, may obtain the content from local storage initially and later change to a cloud-based content provider server as the source for the media content item. The user device may have a user input interface for the user to respond to a notification presenting an option to switch to a content provider with a higher CCE score.

At step 604, the media content application calculates a first CCE score for the user device to receive, using the first application, the media content item from a first content provider. The first content provider may be the content provider from which the user device is obtaining the media content item at step 602. In one embodiment, the user device has begun providing a media content item from the local storage of the user device but finds a version that is higher quality or a different version (e.g., an unabridged, director's cut) of a media content item available from a first content provider (e.g., Hulu). The CCE score may be calculated using modules described in the description of FIG. 3 such as Quality of Service Aggregator 314, CCE Score Calculator 320, and Score Comparer 326. In some embodiments, the CCE score is based on determined QoS characteristic values, which may be determined at a remote server or at the user device. For example, the user device may implement a checksum method to test QoS characteristics of the communications network, such as bit error rate and transmission delay, between the user device and the content provider server.

At step 606, the media content application compares the first CCE score with a predetermined CCE score. The predetermined CCE score may be a CCE score previously determined by the user device or a representation of CCE scores obtained by other user devices. In some embodiments, the predetermined CCE score is a preset static value. The predetermined CCE score is relevant for the time and location it was determined, which matches or is within some margin of error away from the first CCE score. For example, a first CCE score calculated at 2 PM at the intersection of Park Avenue and Broadway may be properly compared to a predetermined CCE score that has also been calculated around 2 PM at similar GPS coordinates. A predetermined CCE score may be a representation (e.g., an average) of CCE scores by other user devices. The user device may use a communications link as depicted in FIG. 5 to obtain CCE scores calculated by other user devices stored at a remote server or stored locally on a privately accessible user device within a home network (e.g., user devices that are all communicatively linked to the same Wi-Fi network).

At step 608, the media content application determines if the first CCE score is less than the predetermined CCE score. The CCE scores may be represented numerically, and the comparison is a simple value comparison. If the first CCE score is not less than the predetermined CCE score, the media content application proceeds to step 618 to provide the media content item from the first content provider, fulfilling the request made in step 602. If the first CCE score is less than the predetermined CCE score, the media content application proceeds to step 610.

At step 610, the media content application determines if the media content item is available from other content providers. If the media content application determines that the media content item that is currently being provided for display from the first content provider is not available from other content providers, then the media content application proceeds to step 618 to provide the media content item from the first content provider. The media content application may, in time, determine a new or updated CCE score for receiving the media content item from the first content provider. In this example, the media content application may return to step 604 to determine the new or updated CCE score and if necessary, provide the media content item from an alternative content provider with an improved performance. If, at step 610, the media content application determines there are other content providers that have the media content item available for the user device, the media content application proceeds to step 612.

At step 612, the media content application calculates a second CCE score for the user device to receive the media content item from a second content provider. If there are multiple content providers offering the media content item, the media content application calculates CCE scores for all content providers. The method of calculating the second CCE score may be similar to that of calculating the first CCE score and may use any of the techniques described in FIG. 3 for calculating the CCE score.

At step 614, the media content application determines if the second CCE score is greater than the first CCE score. If there are multiple content providers offering the media content item, the media content application uses the best of the CCE scores determined in step 612 for comparison with the first CCE score. If the second CCE score is not greater than the first CCE score, the media content application proceeds to step 618 to begin providing the media content item from the first content provider using the first application. If the second CCE score is greater than the first CCE score, the media content application proceeds to step 616 to provide the media content item from the second content provider using the second application.

At step 616, the media content application provides, at the user device using the second application, the media content item from the second content provider. The media content application may have access to the second content provider's software application (i.e., the second application), through an API, for it to execute the application and present the media content item on the user device. A notification may be generated before, during, or after the media content item is provided from the second content provider. The notification provides information to the user regarding the selection of a content provider or switch between content providers, which may include the CCE scores for the user device to receive the media content item from the first content provider and the second provider, improvements to the performance obtained by the second content provider, and prices associated with the cost of obtaining the media content item from the second content provider. The notification may list the aforementioned information associated with not only the second content provider but also other content providers offering the media content item.

At step 618, the media content application provides, at the user device using the first application, the media content item from the first content provider. The media content application may use an API of the first content provider to provide the media content item from the first provider on the user device. For example, the media content application may access the Netflix media player software application through a Netflix API to provide a movie from Netflix on the user device.

Figure 7:
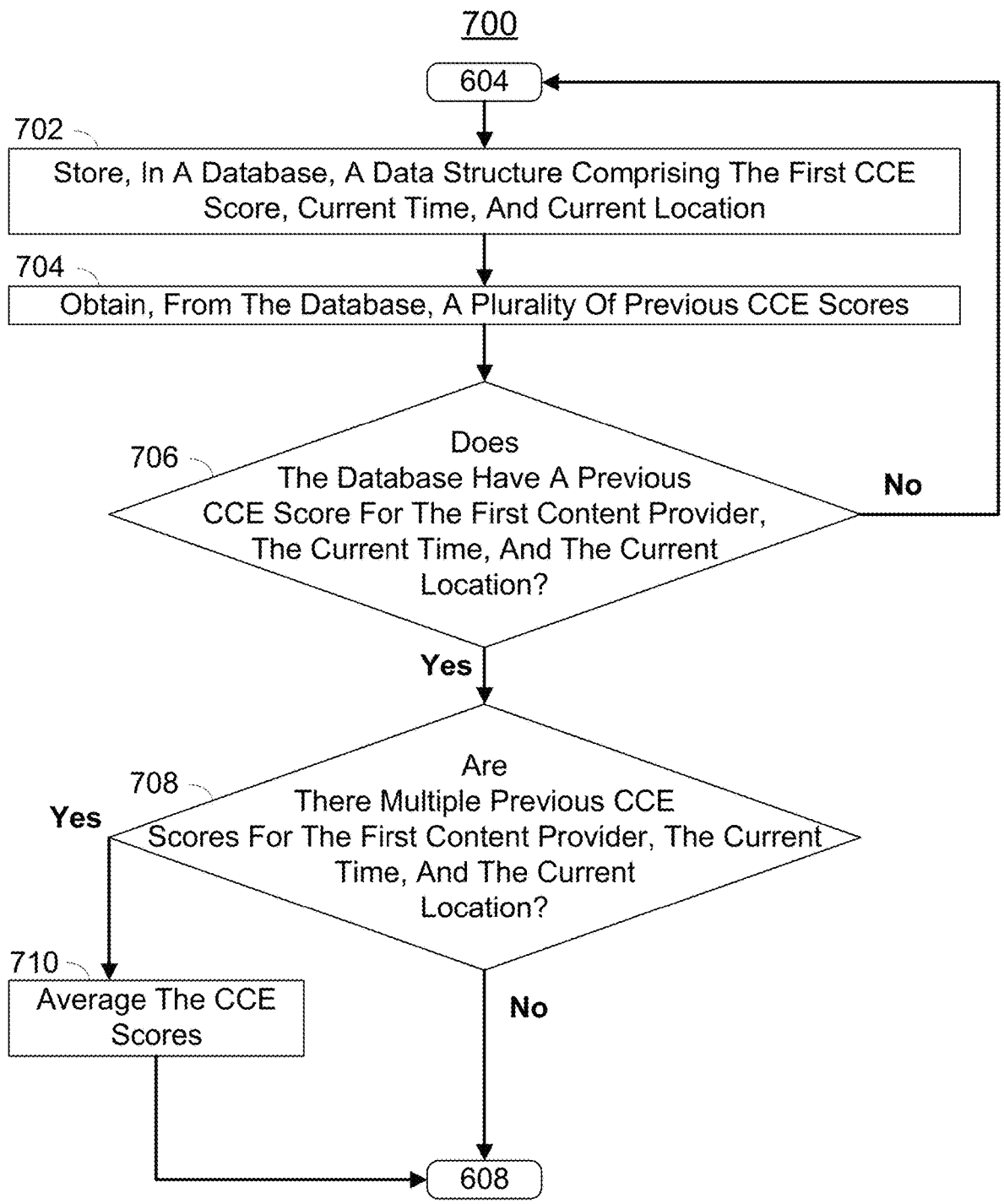
FIG. 7 depicts an illustrative flowchart of a process for comparing a performance score with a predetermined performance score, in accordance with some embodiments of the disclosure.

FIG. 7 depicts an illustrative flowchart of a process 700 for comparing a CCE score with a predetermined CCE score, in accordance with some embodiments of the disclosure. Before the media content application begins determining which other content providers that offer the media content item have a greater CCE score, the media content application determines if the current CCE score for the first content provider is sufficient by comparing it to a predetermined CCE score. It should be noted that the steps of process 700 may be performed by control circuitry 404 of FIG. 4.

At step 702, the media content application stores, in a database, a data structure including the first CCE score, current time, and current location. The data stored may be accessed later when the media content application compares a previously stored CCE score to the latest CCE score calculated for receiving the media content item from the first content provider. The current time may be recorded through a value such as Unix time. The current location may be recorded through values such as GPS coordinates.

At step 704, the media content application obtains, from the database, a plurality of previous CCE scores that were stored either at step 702 or stored by other user devices. The media content application may be communicatively coupled to a server housing previous CCE scores.

At step 706, the media content application determines if the database has a previous CCE score for the first content provider at the current time and the current location. It should be noted that for this step, the media content application is not restricted to an exact time and location match for determining appropriate CCE scores. The media content application employs a margin of error for the time to determine that previous CCE scores that were taken a certain number of units of time before or after the current time recorded in step 702 are acceptable. Comparisons to the current time are interpreted to mean comparisons to a time that is relative to a beginning of a day (e.g., times that were both taken 8 hours and 4 minutes after midnight are considered as being the same time regardless of the day the time was measured). Similarly, the media content application employs a margin of error for the location to determine that previous CCE scores that were taken within a predefined proximity of the current location recorded in step 702 are acceptable. If the media content application determines that there is not a previous CCE score for the first content provider that was recorded within a margin of error of the current time and location, the media content application returns to step 604 to calculate another CCE score for the user device to receive the media content item from the first content provider. If the media content application determines that there is a previous CCE score for the first content provider that was recorded within a margin of error of the current time and location, the media content application proceeds to step 708.

At step 708, the media content application determines if there are multiple previous CCE scores for the first content provider at the current time and the current location. If there are CCE scores recorded for multiple content providers (e.g., a CCE score for the user device to receive the media content item from a second content provider and another CCE score for the user device to receive the media content item from a third content provider), the media content application proceeds to step 710 to average the CCE scores. If there is only one previous CCE score, the media content application proceeds to step 608 to compare the previous CCE score with the first CCE score.

At step 710, the media content application averages the CCE scores for the user device to receive the media content item from the respective content providers. The media content application is not restricted to an average and may implement any suitable method of representing the plurality of scores into a single score. The media content application then returns to step 608 to compare the average score, representing the previous CCE score, with the first CCE score.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:
1. A computer-implemented method for receiving a media content item on a user device, the method comprising:
receiving at the user device located at a geographic location at a particular time a request to receive the media content item using a first application from a first content provider;
determining, using control circuitry, a first performance score associated with receiving over a communication channel, using the first application, at the user device the media content item from the first content provider at the geographic location at the particular time based on historical performance information;
comparing, using the control circuitry, the first performance score with a predetermined performance value to determine whether an adequate performance is achievable for receiving the media content item;

in response to determining that an adequate performance is not achievable:

determining, using the control circuitry, a second performance score associated with receiving over the communication channel, using a second application, at the user device the media content item from a second content provider at the geographic location at the particular time based on the historical performance information, comparing, using the control circuitry, the second performance score to the first performance score to determine a performance indication identifying which of the first application and first content provider or the second application and second content provider provide better performance, and when the performance indication identifies the second application and the second content provider as providing better performance, receiving over the communication channel, at the user device using the second application, the media content item from the second content provider; and providing on the user device, the media content item.

2. The method of claim 1, further comprising receiving at least a first portion of the media content item at the user device using the first application from the first content provider.

3. The method of claim 2, wherein receiving, at the user device using the second application, the media content item from the second content provider comprises receiving, at the user device, at least a second portion of the media content item, using the second application, from the second content provider.

4. The method of claim 3, further comprising, in response to determining that the adequate performance is not achievable:

determining a resumption time within the media content item from the second content provider; and providing, on the user device using the second application, the media content item at the resumption time within the media content item from the second content.

5. The method of claim 4, wherein determining the resumption time within the media content item from the second content provider comprises:

identifying, using a timestamp indicating playback progress of the media content item, a content segment in the media content item; and determining a resumption timestamp associated with a subsequent content segment of the content segment.

6. The method of claim 1, wherein determining the first performance score associated with receiving over the communication channel, using the first application, at the user device the media content item from the first content provider at the geographic location at the particular time based on historical performance information comprises:

determining a plurality of weights for a respective plurality of quality of service characteristics for receiving media content items, wherein the respective plurality of quality of service characteristics for receiving media content items comprise at least one selected from the group of a video resolution, a frame rate, or a bit error rate; and determining the first performance score based on the plurality of quality of service characteristic and on the plurality of weights.

7. The method of claim 1, further comprising, in response to determining that the adequate performance is not achievable, determining that the second content provider is able to provide the media content item to the user device.

8. The method of claim 1, further comprising generating a notification, on the user device, indicating receipt of the media content item from the second content provider.

9. The method of claim 1, wherein using a first application comprises using an application programming interface (API) associated with the first application and wherein using a second application comprises using an application programming interface associated with the second application.

10. A system for providing a media content item, the system comprising:

communications circuitry at a user device for communicating with a first content provider and a second content provider; and control circuitry configured to:

receive at the user device located at a geographic location at a particular time a request to receive the media content item using a first application from the first content provider, determine a first performance score associated with receiving over a communication channel, using a first application, at the user device using the communications circuitry the media content item from the first content provider at the geographic location at the particular time based on historical performance information, compare the first performance score with a predetermined performance value to determine whether an adequate performance is achievable for receiving the media content item, in response to determining that an adequate performance is not achievable:

determine a second performance score associated with receiving over the communication channel, using a second application, at the user device using the communications circuitry the media content item from a second content provider at the geographic location at the particular time based on historical performance information, compare the second performance score to the first performance score to determine a performance indication identifying which of the first application and first content provider or the second application and second content provider provide better performance, and when the performance indication identifies the second application and the second content provider as providing better performance, cause to be received, at the user device using the second application, the media content item from the second content provider, and cause to be provided on the user device, the media content item.

11. The system of claim 10, the control circuitry further configured to receive at least a first portion of the media content item at the user device using the first application from the first content provider.

12. The system of claim 11, wherein the control circuitry is further configured to receive, at the user device using the second application, the media content item from the second content provider by receiving, at the user device, at least a second portion of the media content item, using the second application, from the second content provider.

13. The system of claim 12, the control circuitry further configured, in response to the determining that the adequate performance is not achievable, to:
  determine a resumption time within the media content item from the second content provider; and
  provide, on the user device using the second application, the media content item at the resumption time within the media content item from the second content.

14. The system of claim 13, wherein the control circuitry is configured to determine the resumption time within the media content item from the second content provider by:
  identifying, using a timestamp indicating playback progress of the media content item, a content segment in the media content item; and
  determining a resumption timestamp associated with a subsequent content segment of the content segment.

15. The system of claim 10, wherein the control circuitry is configured to determine the first performance score associated with receiving over the communication channel, using the first application, at the user device the media content item from the first content provider at the geographic location at the particular time based on historical performance information by:
  determining a plurality of weights for a respective plurality of quality of service characteristics for receiving media content items, wherein the respective plurality of quality of service characteristics for receiving media content items comprise at least one selected from the group of a video resolution, a frame rate, or a bit error rate; and
  determining the first performance score based on the plurality of quality of service characteristic and on the plurality of weights.

16. The system of claim 10, the control circuitry further configured, in response to determining that the adequate performance is not achievable, to determine that the second content provider is able to provide the media content item to the user device.

17. The system of claim 10, the control circuitry further configured to generate a notification, on the user device, indicating receipt of the media content item from the second content provider.

18. The system of claim 10, wherein using a first application comprises using an application programming interface (API) associated with the first application and wherein using a second application comprises using an application programming interface associated with the second application.

19. A non-transitory computer-readable medium having instructions encoded thereon that when executed by control circuitry causes the control circuitry to:
  receive at a user device located at a geographic location at a particular time a request to receive a media content item using a first application from a first content provider;
  determine a first performance score associated with receiving over a communication channel, using the first application, at the user device the media content item from the first content provider at the geographic location at the particular time based on historical performance information;
  compare the first performance score with a predetermined performance value to determine whether an adequate performance is achievable for receiving the media content item;
  in response to determining that an adequate performance is not achievable:
    determine a second performance score associated with receiving over the communication channel, using a second application, at the user device the media content item from a second content provider at the geographic location at the particular time based on historical performance information,
    compare the second performance score to the first performance score to determine a performance indication identifying which of the first application and first content provider or the second application and second content provider provide better performance, and
    when the performance indication identifies the second application and the second content provider as providing better performance, receive, at the user device using the second application, the media content item from the second content provider; and
  provide on the user device, the media content item.

20. The non-transitory computer-readable medium of claim 19, further comprising instructions that when executed by the control circuitry cause the control circuitry to receive at least a first portion of the media content item at the user device using the first application from the first content provider.

21. The non-transitory computer-readable medium of claim 20, further comprising instructions that when executed by the control circuitry cause the control circuitry to receive, at the user device using the second application, the media content item from the second content provider by receiving, at the user device, at least a second portion of the media content item, using the second application, from the second content provider.

22. The non-transitory computer-readable medium of claim 21, further comprising instructions that when executed by the control circuitry cause the control circuitry, in response to determining that the adequate performance is not achievable, to:
  determine a resumption time within the media content item from the second content provider; and
  provide, on the user device using the second application, the media content item at the resumption time within the media content item from the second content.

23. The non-transitory computer-readable medium of claim 22, further comprising instructions that when executed by the control circuitry cause the control circuitry to determine the resumption time within the media content item from the second content provider by:
  identifying, using a timestamp indicating playback progress of the media content item, a content segment in the media content item; and
  determining a resumption timestamp associated with a subsequent content segment of the content segment.

24. The non-transitory computer-readable medium of claim 19, further comprising instructions that when executed by the control circuitry cause the control circuitry to determine the first performance score associated with receiving over the communication channel, using the first application, at the user device the media content item from the first content provider at the geographic location at the particular time based on historical performance information by:
  determining a plurality of weights for a respective plurality of quality of service characteristics for receiving media content items, wherein the respective plurality of quality of service characteristics for receiving media content items comprise at least one selected from the group of a video resolution, a frame rate, or a bit error rate; and determining the first performance score based on the plurality of quality of service characteristic and on the plurality of weights.

25. The non-transitory computer-readable medium of claim 19 further comprising instructions that when executed by the control circuitry cause the control circuitry, in response to determining that the adequate performance is not achievable to determine that the second content provider is able to provide the media content item to the user device.

26. The non-transitory computer-readable medium of claim 19 further comprising instructions that when executed by the control circuitry cause the control circuitry to generate a notification, on the user device, indicating receipt of the media content item from the second content provider.

27. The non-transitory computer-readable medium of claim 19, wherein using a first application comprises using an application programming interface (API) associated with the first application and wherein using a second application comprises using an application programming interface associated with the second application.

* * * * *